United States Patent
Takayama et al.

(10) Patent No.: US 10,585,417 B2
(45) Date of Patent: Mar. 10, 2020

(54) MACHINE LEARNING DEVICE, NUMERICAL CONTROL DEVICE AND MACHINE LEARNING METHOD FOR LEARNING THRESHOLD VALUE OF DETECTING ABNORMAL LOAD

(71) Applicant: FANUC CORPORATION, Yamanashi (JP)

(72) Inventors: Kanta Takayama, Yamanashi (JP); Kazuo Sato, Yamanashi (JP); Hideaki Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 451 days.

(21) Appl. No.: 15/609,336

(22) Filed: May 31, 2017

(65) Prior Publication Data
US 2017/0357243 A1    Dec. 14, 2017

(30) Foreign Application Priority Data
Jun. 9, 2016  (JP) .................................. 2016-115505

(51) Int. Cl.
*G05B 19/4065*   (2006.01)
*G06N 3/08*      (2006.01)
*G05B 19/4093*   (2006.01)

(52) U.S. Cl.
CPC ... *G05B 19/4065* (2013.01); *G05B 19/40938* (2013.01); *G06N 3/08* (2013.01); *G05B 2219/33321* (2013.01); *G05B 2219/39352* (2013.01); *G05B 2219/49307* (2013.01)

(58) Field of Classification Search
CPC .................................................. G05B 19/4065
See application file for complete search history.

(56) References Cited

U.S. PATENT DOCUMENTS

| | | | |
|---|---|---|---|
| 6,384,560 B1* | 5/2002 | Kakino | G05B 19/404 318/433 |
| 6,892,110 B2* | 5/2005 | Inoue | B23Q 17/09 700/175 |
| 7,139,635 B2* | 11/2006 | Iihoshi | G05B 19/4155 700/175 |
| 8,768,870 B1 | 7/2014 | Corrado et al. | |

(Continued)

FOREIGN PATENT DOCUMENTS

| CN | 101870075 A | 10/2010 |
|---|---|---|
| CN | 104597842 A | 5/2015 |

(Continued)

*Primary Examiner* — Stanley K. Hill
(74) *Attorney, Agent, or Firm* — Hauptman Ham, LLP (57) ABSTRACT

A machine learning device for learning a threshold value of detecting an abnormal load in a machine tool, includes a state observation unit, and a learning unit. The state observation unit observes a state variable obtained based on at least one of information about a tool, main spindle revolution rate, and amount of coolant of the machine tool, material of a workpiece, and moving direction, cutting speed, and cut depth of the tool, and the learning unit learns the threshold value of detecting an abnormal load based on training data created from an output of the state observation unit and data related to detection of an abnormal load in the machine tool and on teacher data.

13 Claims, 6 Drawing Sheets

(56) References Cited

U.S. PATENT DOCUMENTS

| | | | | |
|---|---|---|---|---|
| 2003/0163286 A1* | 8/2003 | Yasugi | ............... | G05B 19/4065 |
| | | | | 702/185 |
| 2005/0256680 A1 | 11/2005 | Goodman | | |
| 2019/0243333 A1* | 8/2019 | Yoon | ...................... | B23Q 17/00 |

FOREIGN PATENT DOCUMENTS

| CN | 105303197 A | 2/2016 |
|---|---|---|
| JP | H2-270001 A | 11/1990 |
| JP | 4-75848 A | 3/1992 |
| JP | H7-104823 A | 4/1995 |
| JP | 10-34496 A | 2/1998 |
| JP | 2768569 B2 | 6/1998 |
| JP | 2004-130407 A | 4/2004 |

\* cited by examiner

[DURING LEARNING]

FIG. 5

[AFTER LEARNING]

MACHINE LEARNING DEVICE, NUMERICAL CONTROL DEVICE AND MACHINE LEARNING METHOD FOR LEARNING THRESHOLD VALUE OF DETECTING ABNORMAL LOAD

RELATED APPLICATIONS

The present application claims priority to Japanese Patent Application No. 2016-115505 filed Jun. 9, 2016, the disclosure of which is hereby incorporated by reference herein in its entirety.

BACKGROUND OF THE INVENTION

1. Field of the Invention

The present invention relates to a machine learning device, a numerical control device and a machine learning method for learning a threshold value of detecting an abnormal load.

2. Description of the Related Art

In recent years, techniques have been proposed for detecting an abnormal load torque resulting from, for example, machine crashing, a defect in a cutting tool, or damage to a numerical control device (NC device) for controlling a machine tool. Load torque occurs, for example, in response to movement and cutting commands of the G code, but the magnitude of load torque is difficult to predict because it changes depending on a plurality of factors such as cutting speed and cut depth.

For this reason, a threshold for judging that an abnormal load torque has been applied is set, for example, at the sum of a torque value characteristic of the motor and a torque value considered to be appropriate for taking into account a certain offset (allowance). Needless to say, numerical control devices (NC devices) herein include computerized numerical control devices (CNC devices). Further, machine tools include, for example, lathes, drillers, boring machines, millers, grinders, gear cutting and finishing machines, machining centers, electric discharge machines, punching presses, laser machines, carrying machines, plastic injection molding machines, and various others.

Conventionally, various proposals have been made for properly controlling machine tools in accordance with machining conditions of the NC devices. For example, a method is proposed for learning a function for automatically generating machining condition data for controlling machining state of a NC device (Japanese Laid-Open Patent Publication No. H04(1992)-075848: Patent Literature 1). In the learning method described in Patent Literature 1, data of machining factors that affect machining condition data is inputted during actual machining, and a correction amount for the machining condition data is calculated by using a neural network. The correction amount outputted from the neural network is evaluated, and when the correction amount is modified on the basis of the evaluation, the modified amount is accumulated in the storage device as teacher data together with the inputted data to the neural network at the time. On the basis of the accumulated input data and teacher data, the connection parameters of the neural network are learned off-line, using a device separate from the NC device for machining.

Conventionally, there has been provided an NC device with a lost motion correction function, which device controls positions on the basis of commands from the numerical control program and position feedback signals, the device including a multi-layered neural network inference means, a lost motion correction amount calculation means, and a connection weight parameter calculation means (for example, Japanese Patent No. 2768569: Patent Literature 2). In the multi-layered neural network inference means, measurement data on speed, position, and spindle lubrication state is inputted to the input layer, and a lost motion amount or lost motion factor that is inferred from the inputted data is outputted from the output layer. The lost motion correction amount calculation means calculates the lost motion correction amount on the basis of the lost motion amount or lost motion factor outputted from the multi-layered neural network inference means. The connection weight parameter calculation means calculates connection weight parameters between the layers of the multi-layered neural network inference means from the teacher data, which is the data on conditions under which lost motion is measured, i.e., speed, position, and spindle lubrication state measured in advance, and the lost motion amount measured under the measurement condition.

Furthermore, conventionally, there has been proposed a machining center for die and mold machining and the like, which includes a data processing means for processing data necessary for machining and a control means for controlling the machining center on the basis of the data processed by the data processing means (for example, Japanese Laid-Open Patent Publication No. H10(1998)-034496: Patent Literature 3). The machining center further includes a measuring means for measuring rotational runout of the tool, an observation means for making observation of the tip of the tool, and a vibration detection means for detecting an abnormal vibration of the tool, and the data processing means processes data necessary for machining by correlating the state of the tool detected by the measuring means, the observation means, and the vibration detection means with the NC program executed by the tool at the level of the line number of the NC program.

As described above, there have been proposed techniques for detecting an abnormal load torque resulting from, for example, machine crashing, defect in a cutting tool (edged tool), or a damage, in an NC device, but the magnitude of load torque changes depending on various factors such as cutting speed and cut depth, and it has been difficult to calculate a threshold value for judging that an abnormal load torque has been applied.

In the above-described Patent Literature 1, evaluation is made of correction amount whereas in Patent Literature 2 speed and position is the input and lost motion is the output, which means that neither techniques are intended for calculating a threshold value for judging that an abnormal load torque has been applied. The technique in Patent Literature 3 is intended for detecting an abnormal vibration and, again, not for calculating a threshold value for judging that an abnormal load torque has been applied.

Figure 8A:
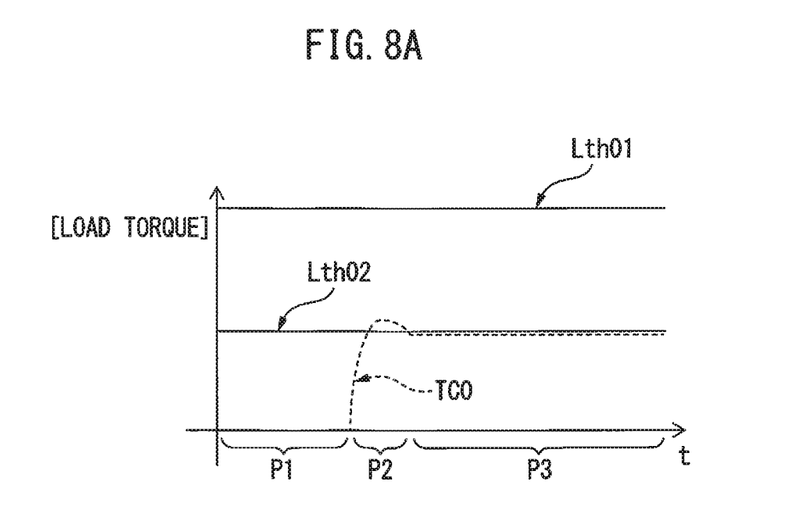
FIG. 8A and FIG. 8B are graphs for illustrating an example and problems with respect to threshold values for detecting an abnormal load with a conventional technique.
Figure 8B:
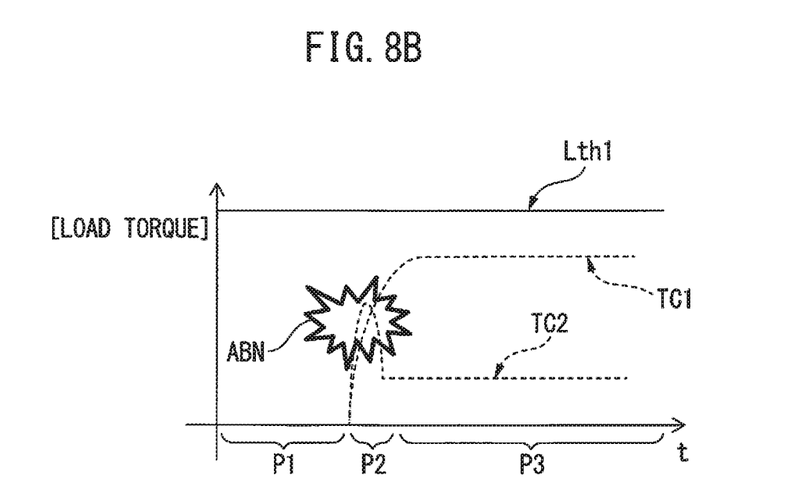

FIG. 8A and FIG. 8B are graphs for illustrating an example and problems with respect to threshold values for detecting an abnormal load with a conventional technique, FIG. 8A for illustrating relations between load torque and time during a processing by a machine tool for cutting, and FIG. 8B is for illustrating an example in which an abnormal load has been applied.

FIG. 8A and FIG. 8B illustrate an example of a lathe that performs machining according to a program by being controlled by an NC device (NC lathe), where the axis of ordinates denotes load torque and the axis of abscissas denotes time elapsed t. In FIG. 8A and FIG. 8B, the reference sign P1 indicates the period of approach, P2 indicates the period for starting the cutting operation, and P3 indicates the period of constant cutting after the start of the cutting operation. In FIG. 8A the reference sign Lth01 indicates a high threshold value for detecting an abnormal load, Lth02 indicates a low threshold value for detecting an abnormal load, and TC0 indicates an example of a common fluctuation curve of load torque.

In FIG. 8B the reference sign TC1 indicates an example of a fluctuation curve of load torque in rough machining, and TC2 indicates an example of a fluctuation curve of load torque in finish machining. On the fluctuation curve TC2 of load torque in finish machining, there is an occurrence of abnormality (abnormal load) at the point indicated by the reference sign ABN.

As illustrated in FIG. 8A, when, for example, a cutting processing according to a program is performed by an NC lathe, load torque is at first very small in the period of approach P1 because during this period the cutting tool merely approaches the workpiece (target object). Load torque then increases in the period for starting the cutting P2 as the cutting tool enters the workpiece and starts cutting. In the period of constant cutting operation P3, load torque becomes constant at a value lower than the peak value during the period for starting the cutting P2 because load torque stabilizes at a cutting amount smaller than during the period for starting the cutting P2.

When the load torque changes as illustrated in FIG. 8A, values of various magnitude, for example, between a high threshold value Lth01 and a low threshold value Lth02, may be selected as a threshold value for detecting an abnormality in load torque (threshold value for detecting an abnormal load), but a threshold value for detecting an abnormal load most appropriate for a specific situation is difficult to calculate.

Furthermore, as illustrated in FIG. 8B, for example, the fluctuation curve TC1 of load torque in rough machining and the fluctuation curve TC2 of load torque in finish machining differ greatly, and accordingly, when the threshold value for detecting an abnormal load Lth1 in rough machining is selected, for example, it is difficult to detect, for example, an occurrence of abnormality at the point ABN on the fluctuation curve TC2 of load torque in finish machining. In other words, as the magnitude of load torque changes depending on various factors such as cutting speed and cut depth, it is not at all easy to calculate a threshold value for judging that an abnormal load torque has been applied.

In the light of the above-described problems with the conventional techniques, an object of the present invention is to provide a machine learning device capable of appropriately calculating a threshold value for detecting an abnormal load, i.e., a threshold value suitable for judging that an abnormal load torque has been applied, a numerical control device, and a machine learning method.

SUMMARY OF INVENTION

According to a first aspect of the present invention, there is provided a machine learning device for learning a threshold value of detecting an abnormal load in a machine tool, including a state observation unit that observes a state variable obtained based on at least one of information about a tool, main spindle revolution rate, and amount of coolant of the machine tool, material of a workpiece, and moving direction, cutting speed, and cut depth of the tool; and a learning unit that learns the threshold value of detecting an abnormal load based on training data created from an output of the state observation unit and data related to detection of an abnormal load in the machine tool and on teacher data.

The learning unit may include an error calculation unit that calculates an error between the training data and the teacher data; and a learning model updating unit that updates a learning model for defining an error of a condition correlated to a detection of an abnormal load in the machine tool based on an output of the state observation unit and an output of the error calculation unit. The training data may be data related to a predicted load current value, which is a value of a prediction of a current through a load, and the teacher data may be data related to a measured load current value, which is a value of an actual measurement of a current through the load.

The information about a tool may include information on type, material, and diameter of the tool. The machine learning device may be on a cloud server. The machine learning device may be on a fog server. The machine learning device may be connectable to at least one other machine learning device, and mutually exchange or share an outcome of machine learning with the at least one other machine learning device. The machine learning device may include a neural network.

According to a second aspect of the present invention, there is provided a numerical control device that includes the machine learning device according to the above described first aspect and controls the machine tool, wherein the numerical control device detects an abnormal load in the machine tool based on the threshold value of detecting an abnormal load learned by the machine learning device. The numerical control device may judge that an abnormal load has been detected in the machine tool when a measured load current value, which is a value of an actual measurement of a current through a load, is greater than the sum of the threshold value of detecting an abnormal load and a predefined offset amount.

The numerical control device may operate in phases including a learning phase for learning the threshold value of detecting an abnormal load and an application phase for controlling the machine tool to actually machine the workpiece, learning for the threshold value of detecting an abnormal load may be performed in the learning phase, based on respective load current values for machining conditions, by performing prearranged exercise machining, and an abnormal load may be detected in the machine tool in the application phase by comparing the learned threshold value of detecting an abnormal load with the measured load current value, which is a value of an actual measurement of a current through the load. The learning for the threshold value of detecting an abnormal load may be performed also in the application phase.

According to a third aspect of the present invention, there is provided a machine learning method for learning a threshold value of detecting an abnormal load in a machine tool, including observing a state variable obtained based on at least one of information about a tool, main spindle revolution rate, and amount of coolant of the machine tool, material of a workpiece, and moving direction, cutting speed, and cut depth of the tool; and learning the threshold value of detecting an abnormal load, based on training data created from the state variable and data related to detection of an abnormal load in the machine tool and on teacher data.

Learning the threshold value of detecting an abnormal load may include calculating an error between the training data and the teacher data; and updating a learning model for defining an error of a condition correlated to a detection of an abnormal load in the machine tool based on the state variable and the calculated error between the training data and the teacher data. The training data may be data related to a predicted load current value, which is a value of a prediction of a current through a load, and the teacher data may be data related to a measured load current value, which is a value of an actual measurement of a current through the load.

DETAILED DESCRIPTION

Figure 1:
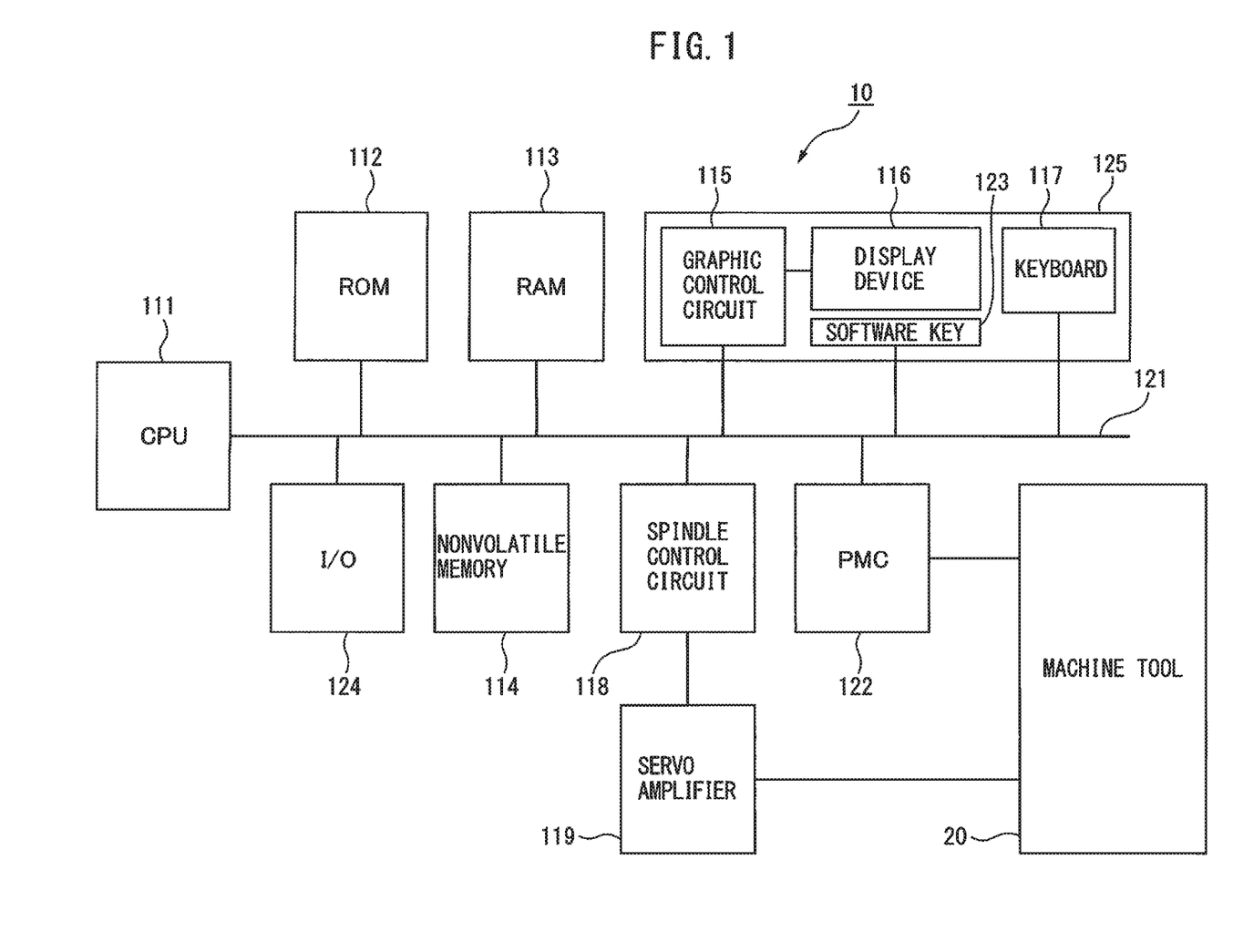
FIG. 1 is a block diagram schematically illustrating an example of a numerical control device for controlling a machine tool.

An embodiment of a machine learning device, a numerical control device, and a machine learning method of the present invention will be described in detail below with reference to the attached drawings. FIG. 1 is a block diagram schematically illustrating an example of a numerical control device for controlling a machine tool.

As illustrated in FIG. 1, a numerical control device (NC device) 10 includes, for example, a CPU (Central Processing Unit, or processor) 111, a ROM (Read Only Memory) 112, a RAM (Random Access Memory) 113, an I/O (Input/Output) 124, a nonvolatile memory 114 (for example, flash memory), a spindle control circuit 118, and a PMC (Programmable Machine Controller) 122, all connected with a bus 121. To the bus 121, a graphic control circuit 115, a software key 123, and a keyboard 117 of a display device/MDI (Manual Data Input) panel 125, for example, are connected. The display device/MDI panel 125 is provided with a display device 116 such as an LCD (Liquid Crystal Display) connected with the graphic control circuit 115. A machine tool 20 (a motor provided for a machine tool) is controlled by, for example, a PMC 122 and a servo amplifier 119 connected with the spindle control circuit 118.

For example, the CPU 111 controls the whole NC device 10 in accordance with a system program stored in the ROM 112. The RAM 113 stores various data or input/output signals, and the nonvolatile memory 114 stores, for example, positioning information, speed information, acceleration information, and information on positioning deviations, torque commands, load current values, and vibration values, pieces of above-mentioned information stored chronologically on the basis of time information as to when they are obtained.

The graphic control circuit 115 converts digital signals to display signals and feed the converted signals to the display device 116, and the keyboard 117 includes numeric keys, letter keys and the like for inputting various setting data. The spindle control circuit 118 receives movement commands for the spindles from the CPU 111 and outputs commands for the spindles to the servo amplifier 119, and the servo amplifier 119 in turn drives the servo motors 21 provided for the machine tool 20 in accordance with the movement commands from the spindle control circuit 118.

When the machining program is executed, the PMC 122 receives a T function signal (tool selection command) or the like via the bus 121 and processes this signal in accordance with the sequence program to obtain an operation command to control the machine tool 20. The PMC 122 receives a state signal from the machine tool 20 and transfers a certain input signal to the CPU 111. The function of the software key 123 varies, for example, depending on the system program or the like, and the I/O (interface) 124 transmits NC data to an external storage device or the like.

Figure 2:
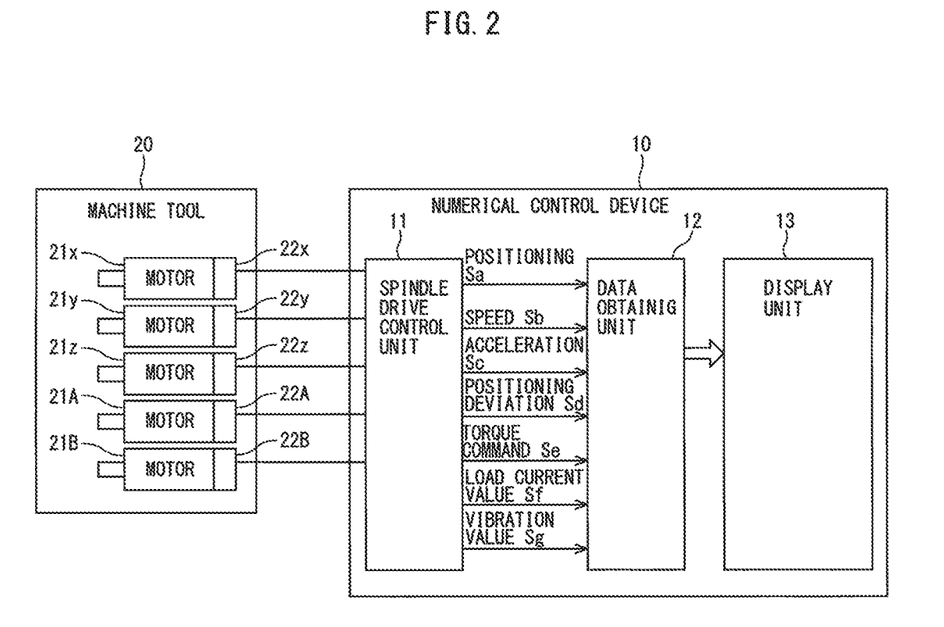
FIG. 2 is a block diagram illustrating main parts of the machine tool and the numerical control device in FIG. 1.

FIG. 2 is a block diagram illustrating main parts of the machine tool and the numerical control device in FIG. 1. As illustrated in FIG. 2, the NC device (numerical control device) 10 includes, for example, a spindle drive control unit 11, a data obtaining unit 12, and a display unit 13. The machine tool 20 includes, for example, servo motors $21x$, $21y$, $21z$, 21A, and 21B for driving the feed spindles, and the servo motors $21x$, $21y$, $21z$, 21A, and 21B are driven and controlled in accordance with torque commands from the spindle drive control unit 11 of the NC device 10, via a servo amplifier (corresponding to, for example, the servo amplifier 119 in FIG. 1). In the present description, load torque corresponds to load current, for example, for driving each of the servo motors $21x$, $21y$, $21z$, 21A, and 21B.

The servo motors $21x$, $21y$, $21z$, 21A, and 21B are respectively provided with position detection devices $22x$, $22y$, $22z$, 22A, and 22B, and the position detection devices $22x$, $22y$, $22z$, 22A, and 22B feedback positioning information of respective servo motors $21x$, $21y$, $21z$, 21A, and 21B to the spindle drive control unit 11.

In accordance with the movement command issued by the numerical control unit that analyzes and processes the machining program of the NC device 10 and the positioning information Sa fed back from the servo motor 21, the spindle drive control unit 11 calculates speed information Sb, acceleration information Sc, positioning deviation sd, and torque command Se of each driving spindle, obtains load current value Sf of the servo amplifier, obtains vibration values Sg from the shock sensors respectively provided for spindle motors, and outputs these pieces of information to the data obtaining unit 12 together with the fed-back positioning information Sa.

The data obtaining unit 12 obtains the pieces of information from the spindle drive control unit 11 at certain intervals and at the same time. While obtaining the pieces of information from the spindle drive control unit 11 at certain intervals and at the same time, the data obtaining unit 12 may also obtain the number of the block of the machining program being executed that may be obtained in the NC device 10. Note that FIG. 1 and FIG. 2 are for illustrative purposes only, and, for example, NC devices incorporating an embodiment of the machine learning device according to the present invention are not limited to those illustrated in FIG. 1 and FIG. 2.

Figure 3:
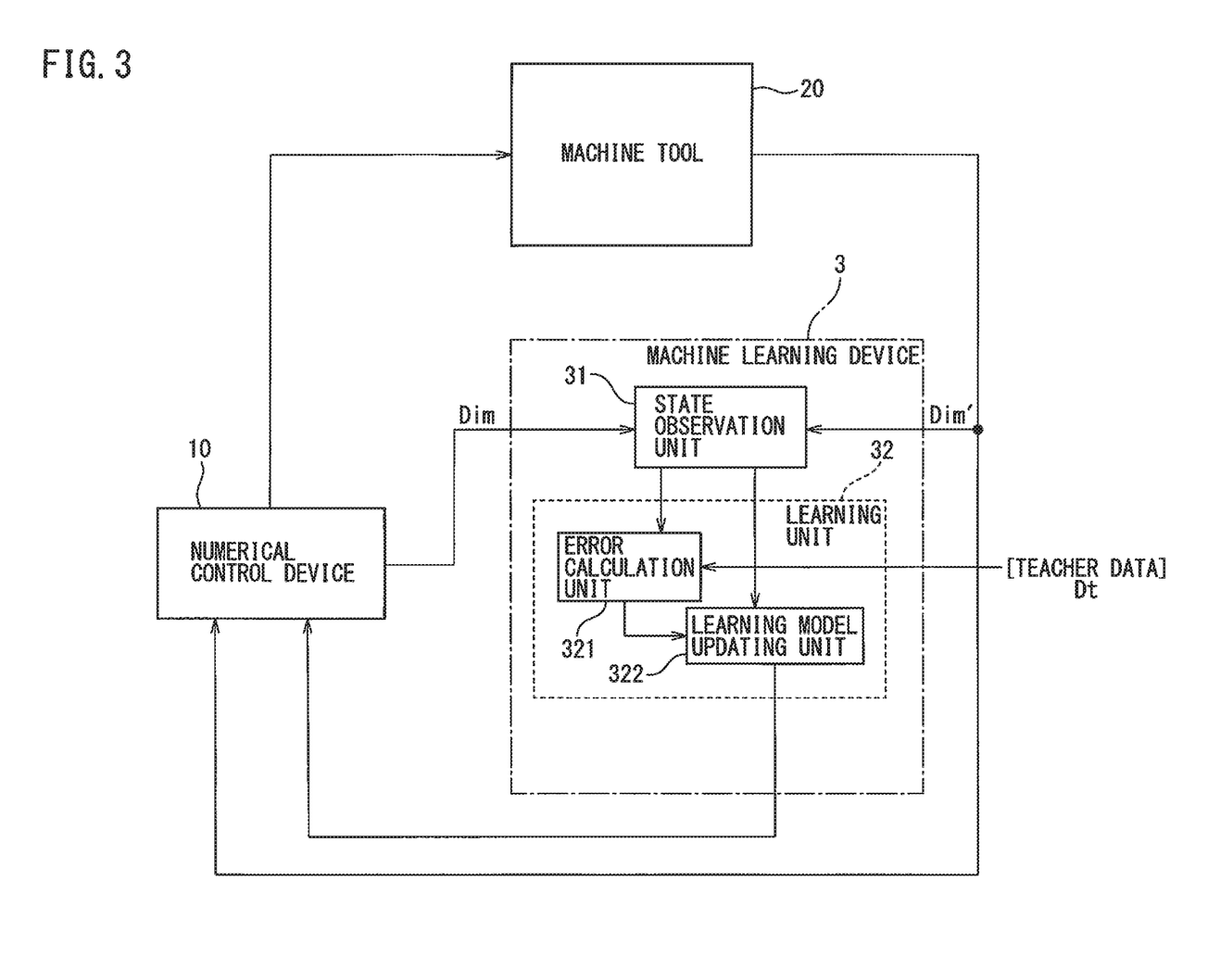
FIG. 3 is a block diagram illustrating an example of a machine learning device according to the present embodiment.

FIG. 3 is a block diagram illustrating an example of a machine learning device according to the present embodiment. The machine learning device 3 illustrated in FIG. 3 is an application of supervised learning, and learns a threshold value for detecting an abnormality in load torque (threshold value for detecting an abnormal load). In supervised learning, teacher data Dt, i.e., a set of a large number of pairs of inputs and outcomes (labels) is given to a machine learning device, and the machine learning device thereby learns features in the data set and deductively obtains a model (learning model) for inferring outcomes from inputs, i.e., relationship between inputs and outputs.

As illustrated in FIG. 3, the machine learning device 3 includes a state observation unit 31 and a learning unit 32. To the state observation unit 31 are inputted, for example, information about a tool such as a cutting tool (type, material, diameter, and the like), moving direction of the tool, material of a workpiece, cutting speed, main spindle revolution rate, cut depth, and coolant (supply) amount as state variables (state amount). These state variables may be inputted, for example, as input data Din from the NC device 10, and may be inputted as input data Din' from the machine tool 20. In other words, state variables (Din') to be inputted from the machine tool 20 may be, for example, data detected by various sensors provided for the machine tool 20 (for example, temperature sensors and the like attached to the servo motors), data obtained by the operator who operates the machine tool 20, or various other data. The machine learning device 3 may be provided, for example, for each NC device 10, or may be provided, for example, on a cloud server or on a fog server disposed on a level lower than the cloud server, connected via a network with the NC devices as will be described below with reference to FIG. 7.

The learning unit 32 receives observed state variables (Din, Din') from the state observation unit 31, creates training data, and learns a threshold value of detecting an abnormal load on the basis of the training data and the teacher data Dt inputted from the outside. In other words, as illustrated in FIG. 3, the learning unit 32 includes an error calculation unit 321 and a learning model updating unit 322, and the error calculation unit 321 calculates the error between the training data and the teacher data Dt. The learning model updating unit 322 receives the output of the state observation unit 31 and the output of the error calculation unit 321, and updates the learning model for defining an error of a condition correlated to a threshold value for detecting an abnormal load.

The machine learning device 3 may be implemented by, for example, using an algorithm such as a neural network. General-purpose computers or processors may be used for the machine learning device 3 and GPGPU (General-Purpose calculating on Graphics Processing Units) or large-scale PC clustering, for example, may be applied to achieve high speed processing.

As for teacher data Dt, for example, when one and the same NC device is used to cause one and the same machine tool to perform identical tasks, labeled data obtained and stored till one day before the day of actually performing the task may be supplied to the error calculation unit 321 as teacher data. Alternatively, for example, data obtained by simulations and the like performed outside the NC device or labeled data from another NC device may be supplied to the error calculation unit 321 of the machine learning device 3 as teacher data Dt by using a memory card or via communication lines. Further, teacher data (labeled data) Dt may be stored in, for example, nonvolatile memory such as flash memory contained in the learning unit 32, and the labeled data stored in the nonvolatile memory may be used as it is by the learning unit 32.

Figure 4:
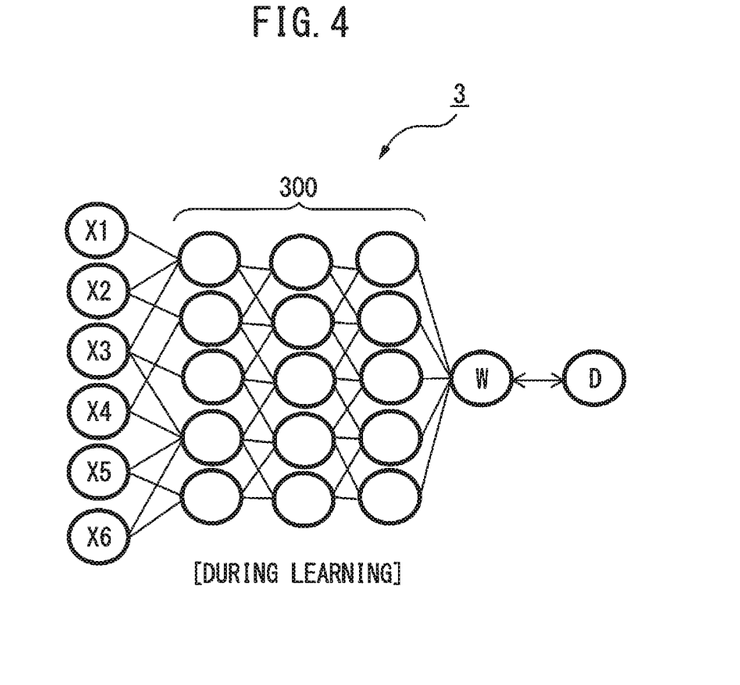
FIG. 4 is a diagram for illustrating an example of the learning phase in the operation of the machine learning device according to the present embodiment.
Figure 5:
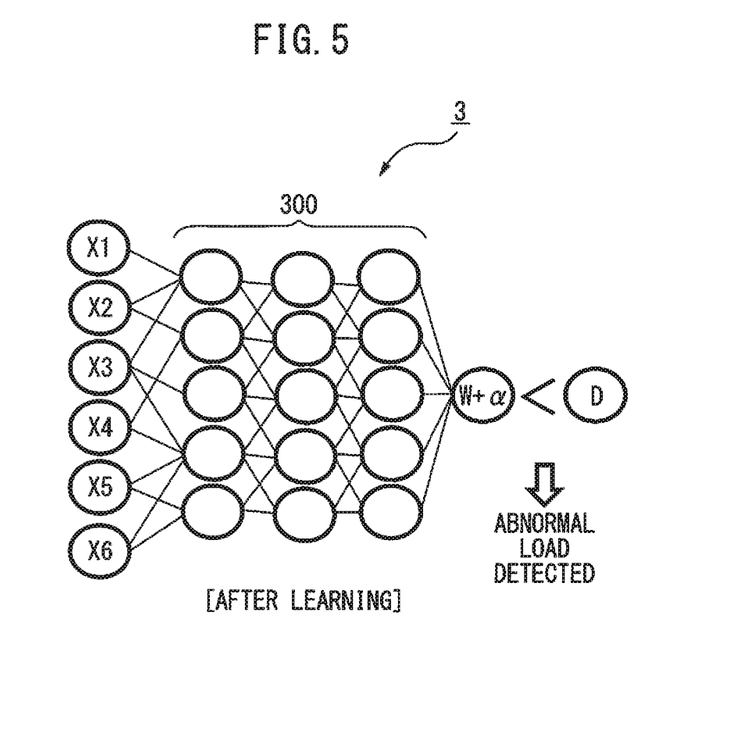
FIG. 5 is a diagram for illustrating an example of the application phase in the operation of the machine learning device according to the present embodiment.
Figure 6:
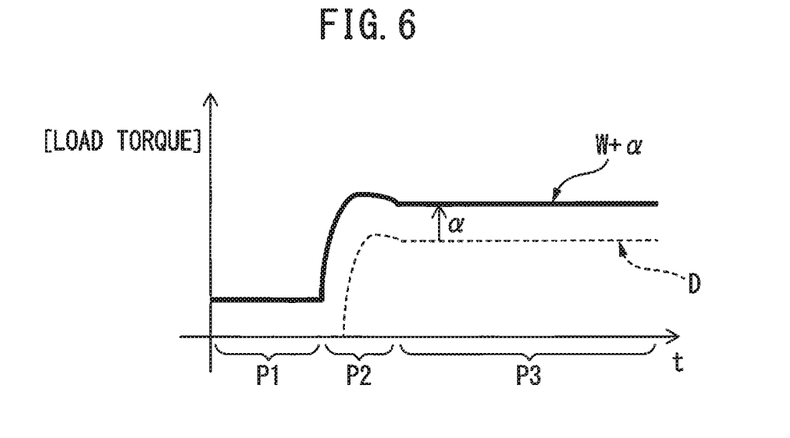
FIG. 6 is a graph for illustrating an example of a threshold value for detecting an abnormal load obtained by the machine learning device according to the present embodiment.

FIG. 4 is a diagram for illustrating an example of the learning phase in the operation of the machine learning device according to the present embodiment, and FIG. 5 is a diagram for illustrating an example of the application phase in the operation of the machine learning device according to the present embodiment. FIG. 6 is a graph for illustrating an example of a threshold value for detecting an abnormal load obtained by the machine learning device according to the present embodiment.

With reference to FIG. 4 and FIG. 5, an example will be described in which a threshold value for detecting an abnormal load is learned in the learning phase, and the threshold value for detecting an abnormal load obtained by the learning is used in the actual application phase to detect an abnormal load. In other words, the NC device (numerical control device) 10 operates in phases including the learning phase for learning a threshold value for detecting an abnormal load and the application phase for controlling the machine tool 20 to actually machine a workpiece.

First, as illustrated in FIG. 4, in the learning phase, numerically coded information of a tool (for example, information about type, material and diameter of the tool: X1), numerically coded material of the workpiece (X2), moving direction of the tool (feed rates of the spindles: X3), cutting speed (composition of velocities: X4), main spindle revolution rate (X5), and cut depth (coolant amount: X6) are given as inputs (state variables) to the machine learning device 3 including a neural network 300 on a cycle of, for example, milliseconds to tens of milliseconds.

Note that the neural network 300 is illustrated as having three layers in FIG. 4 (FIG. 5) for simplicity's sake only and, needless to say, it has far more layers in actuality. Further, not all of the above-described X1 to X6 need to be given to the neural network 300 as state variables, and it suffices to give the neural network at least one of them. Furthermore, state variables to be given to the neural network 300 are not limited to the above-described X1 to X6 and may include, for example, other data related to the machine tool 20 or the workpiece. Still further, for example, each of the servo motors 21x, 21y, 21z, 21A, and 21B illustrated in FIG. 2 may be taken as load, and the threshold value for detecting an abnormal load obtained through learning may be, for example, a separate threshold value for each of the servo motors 21x, 21y, 21z, 21A, and 21B corresponding to the given inputs X1 to X6. However, the threshold value for detecting an abnormal load obtained through learning need not be a separate threshold value for each of the servo motors but may be a threshold value for a plurality of servo motors.

In the learning phase, it is preferable, for example, to machine a workpiece in prearranged exercise machining to learn a threshold value of detecting an abnormal load, on the basis of the load current values under various machining conditions. In the learning phase, for example, a predicted load current value, which is a value of a prediction of a current through the load, is outputted as an output W from the neural network 300 (machine learning device 3). The machine learning device 3 performs learning so that the training data related to the predicted load current value W may be in agreement with the teacher data D, which is the data related to the measured load current value, which is a value of an actual measurement of the current through the load D. In other words, where the loss function is y (Xn, W), D, the processes in the learning phase continue to be performed until the loss function converges to a certain value. Next, as illustrated in FIG. 5, in the application phase as in the above-described learning phase, inputs X1 to X6, for example, are given to the neural network 300 as inputs. At this point, as the neural network 300 has completed learning in the learning phase, the neural network 300 outputs a predicted load current value W as the threshold value for detecting an abnormal load corresponding to the inputs X1 to X6.

As illustrated in FIG. 5 and FIG. 6, in the application phase, the learned threshold value for detecting an abnormal load (predicted load current value W) is compared with the measured load current value D, which is a value of an actual measurement of the current through the load. An abnormal load is determined to have been detected when, for example, the measured load current value D is greater than the sum (W+α) of the threshold value for detecting an abnormal load W and a predefined offset amount α. It is preferable that detection for abnormal load is performed, for example, for each load (servo motor). However, a load need not be an individual servo motor and it is needless to say that detection for abnormal load may be performed as to a plurality of servo motors.

Hereinabove, learning for a threshold value for detecting an abnormal load performed in the learning phase may also be performed in the application phase as a matter of course. The teacher data to be given to the machine learning device 3 may be, for example, the measured load current value D as such, and may also be a measured load current value D obtained by a simulation or the like carried out outside the NC device, corresponding to inputs X1 to X6, or labeled data of other NC devices. Furthermore, the machine learning device according to the present embodiment 3 may be, for example, contained in the NC device 10 described with reference to FIG. 1 and FIG. 2.

As is clear in FIG. 6, according to the present embodiment, abnormalities in load torque (load current), which changes depending on various factors such as cutting speed and cut depth, are correctly detected by, for example, comparing the measured load current value D with the sum (W+α) of the threshold value for detecting an abnormal load W and a certain offset amount α, and by judging that an abnormal load has been detected when W+α<D. In other words, according to a machine learning device, a numerical control device, and a machine learning method according to the present embodiment, a threshold value suitable for judging that an abnormal load torque has been applied may be calculated and, as a result, abnormal load may be detected in various conditions under which the machine tool is used.

Figure 7:
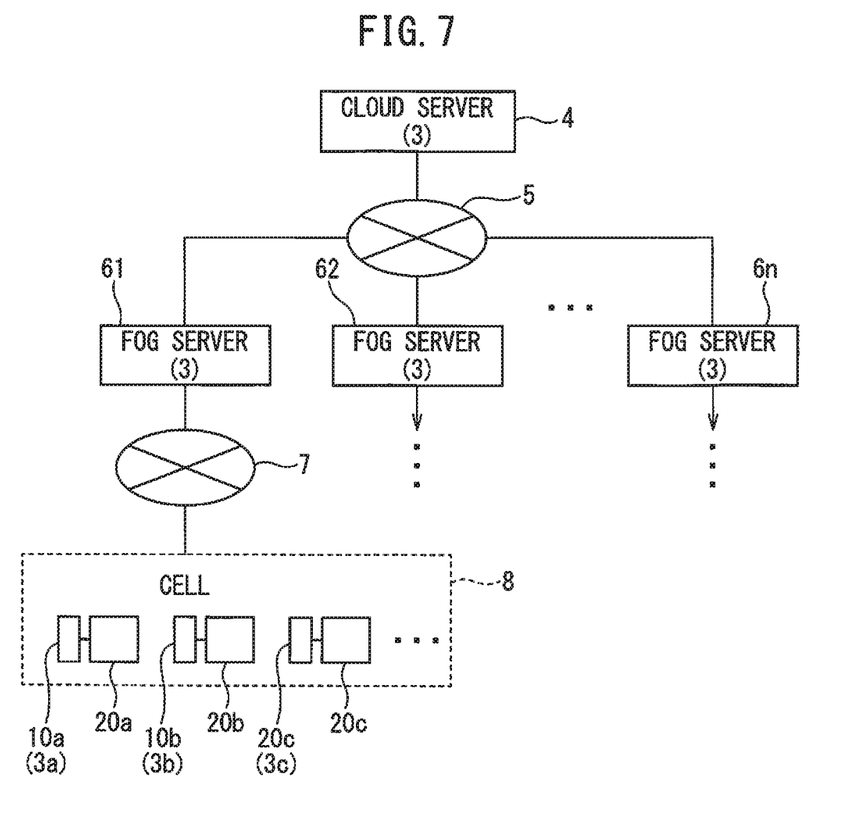
FIG. 7 is a block diagram illustrating an example of a network in which the machine learning device according to the present embodiment is applied.

FIG. 7 is a block diagram illustrating an example of a network in which the machine learning device according to the present embodiment is applied. As illustrated in FIG. 7, a machine learning device 3 may be provided, for example, on a cloud server 4, on each of the fog servers 61 to 6n, or on one of the fog servers 61 to 6n. Further, as for the manner of provision of the machine learning device 3, machine learning devices 3a, 3b, 3c may be respectively provided for NC devices (terminals, edges) 10a, 10b, 10c ... that control respective machine tools 20a, 20b, 20c, and distributed learning may be performed by these machine learning devices.

In FIG. 7, a cell (for example, machine tool cell) 8 includes a plurality of NC devices 10a, 10b, 10c, ... (the machine tool 20a, 20b, 20c, ... ), and these plurality of NC devices 10a, 10b, 10c, ... are connected with the fog server 61 via a network 7. A plurality of cells 8 are provided for a factory, for example, but, needless to say, various modifications and alteration may be made to such a configuration.

When the machine learning devices 3a, 3b, 3c, ... are respectively provided for NC devices 10a, 10b, 10c, ... , the machine learning device 3a provided for the NC device 10a, for example, is made communicable via a network or the like with the machine learning device 3b provided for the separate NC device 10b, and may mutually exchange or share the outcome of machine learning with the machine learning device 3b provided for the NC device 10b. When a machine learning device 3 is provided for each of the fog servers 61 to 6n, the result of learning by each machine learning device 3 may be exchanged or shared among the machine learning devices, for example, via a network 5. As described above, the results of learning by the plurality of machine learning devices 3a, 3b, ... (3) may be exchanged or shared among the machine learning devices, thereby improving learning effects.

Note that a plurality of cells 8 each including a plurality of the NC devices 10a, 10b, 10c, ... (the machine tool 20a, 20b, 20c, ... ) may be connected to the network 7, and the network need not consist of merely two layers 5 and 7, but may include three or more layers. Furthermore, the machine learning device 3 may be provided on the cloud server 4 and, needless to say, various modifications and alterations may be made to these configurations as appropriate when necessary.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for learning a threshold value of detecting an abnormal load in a machine tool, comprising:
   a state observation unit that observes a state variable obtained based on at least one of information about a tool, main spindle revolution rate, and amount of coolant of the machine tool, material of a workpiece, and moving direction, cutting speed, and cut depth of the tool; and
   a learning unit that learns the threshold value of detecting an abnormal load based on training data created from an output of the state observation unit and data related to detection of an abnormal load in the machine tool and on teacher data, wherein the learning unit comprises:
      an error calculation unit that calculates an error between the training data and the teacher data; and
      a learning model updating unit that updates a learning model for defining an error of a condition correlated to a detection of an abnormal load in the machine tool based on an output of the state observation unit and an output of the error calculation unit.

2. The machine learning device according to claim 1, wherein
   the training data is data related to a predicted load current value, which is a value of a prediction of a current through a load, and the teacher data is data related to a measured load current value, which is a value of an actual measurement of a current through the load.

3. The machine learning device according to claim 1, wherein the information about a tool comprises information on type, material, and diameter of the tool.

4. The machine learning device according to claim 1, wherein the machine learning device is on a cloud server.

5. The machine learning device according to claim 1, wherein the machine learning device is on a fog server.

6. The machine learning device according to claim 1, wherein the machine learning device is connectable to at least one other machine learning device, and mutually exchange or share an outcome of machine learning with the at least one other machine learning device.

7. The machine learning device according to claim 1, wherein the machine learning device comprises a neural network.

8. A numerical control device that comprises the machine learning device according to claim 1 and controls the machine tool, wherein the numerical control device detects an abnormal load in the machine tool based on the threshold value of detecting an abnormal load learned by the machine learning device.

9. The numerical control device according to claim 8, wherein the numerical control device judges that an abnormal load has been detected in the machine tool when a measured load current value, which is a value of an actual measurement of a current through a load, is greater than the sum of the threshold value of detecting an abnormal load and a predefined offset amount.

10. The numerical control device according to claim 9, wherein
the numerical control device operates in phases comprising a learning phase for learning the threshold value of detecting an abnormal load and an application phase for controlling the machine tool to actually machine the workpiece,
learning for the threshold value of detecting an abnormal load is performed in the learning phase, based on respective load current values for machining conditions, by performing prearranged exercise machining, and
an abnormal load is detected in the machine tool in the application phase by comparing the learned threshold value of detecting an abnormal load with the measured load current value, which is a value of an actual measurement of a current through the load.

11. The numerical control device according to claim 10, wherein the learning for the threshold value of detecting an abnormal load is performed also in the application phase.

12. A machine learning method for learning a threshold value of detecting an abnormal load in a machine tool, comprising:
observing a state variable obtained based on at least one of information about a tool, main spindle revolution rate, and amount of coolant of the machine tool, material of a workpiece, and moving direction, cutting speed, and cut depth of the tool; and
learning the threshold value of detecting an abnormal load, based on training data created from the state variable and data related to detection of an abnormal load in the machine tool and on teacher data, wherein learning the threshold value of detecting an abnormal load comprises:
calculating an error between the training data and the teacher data; and
updating a learning model for defining an error of a condition correlated to a detection of an abnormal load in the machine tool based on the state variable and the calculated error between the training data and the teacher data.

13. The machine learning method according to claim 12, wherein
the training data is data related to a predicted load current value, which is a value of a prediction of a current through a load, and
the teacher data is data related to a measured load current value, which is a value of an actual measurement of a current through the load.

* * * * *